Feb. 13, 1940.        J. A. VICTOREEN         2,190,200
                   X-RAY MEASURING INSTRUMENT
                     Filed Nov. 24, 1936
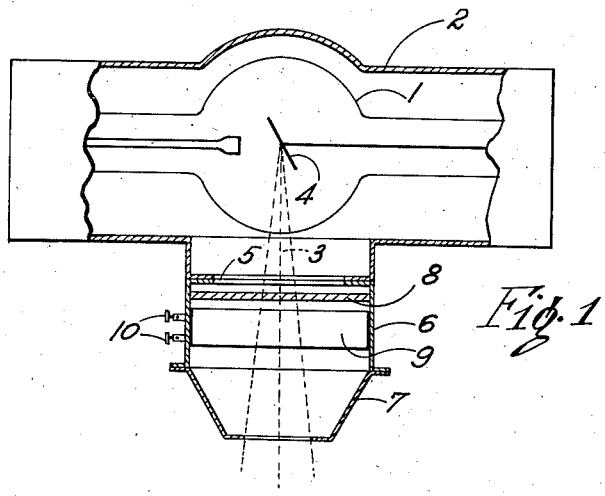
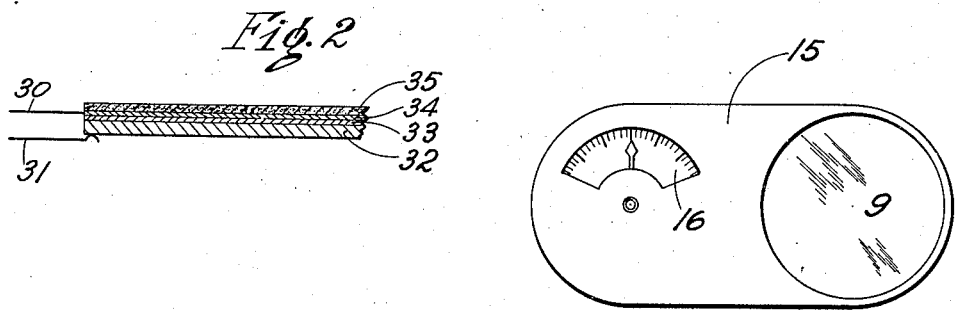
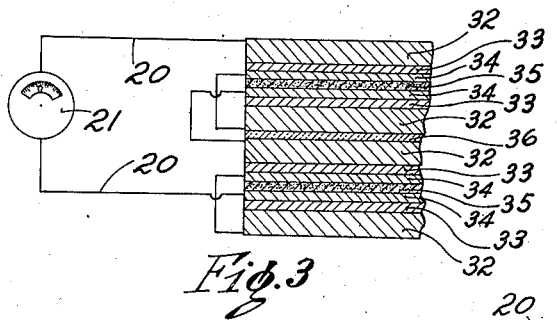
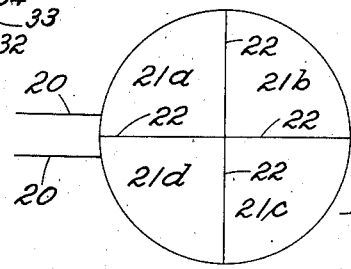
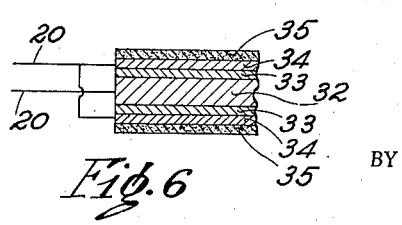
INVENTOR.
JOHN A. VICTOREEN
BY
ATTORNEYS Patented Feb. 13, 1940

2,190,200

UNITED STATES PATENT OFFICE 2,190,200

X-RAY MEASURING INSTRUMENT

John A. Victoreen, Cleveland Heights, Ohio

Application November 24, 1936, Serial No. 112,481

3 Claims. (Cl. 250—83)

This invention relates to improvements in devices for measuring the intensity of radiations from X-ray machines or the like.

Heretofore the measuring of the intensity of X-ray emanations has required relatively complicated, delicate and expensive apparatus, and so far as I am aware, there have been no machines which would give instantaneous readings of the X-ray output; it being necessary in connection with the previous instruments to operate the same for a predetermined length of time after which the output could be computed.

The present invention contemplates a device which may be conveniently mounted in the treatment cone of an X-ray machine and connected by suitable leads to an output meter disposed at a place remote from the machine for indicating constantly during operation the output of the machine. It also contemplates a small, portable, inexpensive direct reading device which will give instantaneous readings of the X-ray output much in the same manner as the well known light or exposure meters.

Still other advantages of the invention and the invention itself will become more apparent from the following description which, together with the accompanying drawing, forms a part of this specification.

In the drawing:

Fig. 1 is a diagrammatic view of an X-ray tube showing the measuring device in position in the treatment cone;

Fig. 2 is a magnified view of a fragment of one of the elements which compose my invention;

Fig. 3 is a fragmentary magnified view of a battery of elements embodying the invention;

Fig. 4 is a plan view of a portable meter embodying the invention;

Fig. 5 is a diagrammatic view of another arrangement of cells;

Fig. 6 is a view similar to Fig. 2 of a modified form of my invention.

Referring now to the drawing throughout which like parts are designated by like reference characters.

As best shown in Fig. 1, the X-ray tube 1 is disposed in the usual holder or container 2, which comprises a shield, and the rays 3 from the anode 4 of the tube are directed through a window 5 in the side of the casing. A treatment cone 6, through which the rays pass, is shown adjacent the window, and a detachable mask 7 is provided in the end of the treatment cone nearest the patient or article being subjected to the action of the rays.

The treatment cone may contain the usual filters, such as 8, and my element 9 which is effective to measure the ray intensity. Terminals 10 from the element 9 extend to the outside of the cone and are adapted to be connected by suitable conductors to an output measuring meter.

The ray intensity sensitive element may be manufactured in several ways. For instance it may comprise a thin sheet of copper 32 as diagrammatically illustrated in Fig. 2, having a thin layer of copper (cuprous) oxide 33 deposited on its surface. It is well known that when such a combination is subjected to light, a current is generated which current may be measured by a milliammeter. The amount of the current is dependent upon the area of the cell and the external resistance.

In order to take advantage of the current, a thin transparent layer of conductive material 34, such as silver, or a grid of suitable conducting material, is disposed in contact with the copper oxide and connected by a lead 30 to a meter. The other terminal 31, for the cell is taken directly from the copper.

In order to increase the activity of the cell when exposing it to X-ray emanations I may also place an exciting member 35 in juxtaposition to the oxide coated surface. The exciting member is adapted to fluoresce, upon being subjected to X-ray radiation, within the light range to which the cell is responsive. The X-rays then cause the fluorescent member to fluoresce which assists in causing the cell to generate a current. The current may then be measured by a milliammeter or the like and is proportional to the intensity of the X-ray emanation.

The type of fluorescent material may also be varied to provide fluorescence of different wave length. If the fluorescence is desired in the visible field, one such material would be barium platino-cyanide $(BaPt(CN)_4 . 4H_2O)$. If the fluorescence is desired in the ultra-violet region, calcium tungstate $(CaWO_4)$ is effective; and if fluorescence is desired in the X-ray region, lead or barium platino-cyanide is suitable.

It is to be understood that other substances than copper and copper oxide may be used as the active elements of the cell and that the matter of choice depends upon the wave length to which the cell is to be responsive. The wave length response of the cell also determines the type of exciting material.

One particular condition which may control the selection of a certain material for the cell is the filtering action of the material used for the filter 8. For instance, it is often desirable to use a material which provides a uniform response of the complete unit to the radiation over certain bands as compared to a standard air chamber. The use of a suitable substance removes the secondary radiations or may add fluorescent radiation in X-ray or visible range to a point where the cell response is substantially uniform to the wave lengths encountered.

The cell itself is particularly adapted to serve as the filter for removing the undesired radiations; copper being often used as a filter to remove certain undesired wave lengths. In this event the other filter 8 may be eliminated or altered.

This type of installation assures that all of the rays used will pass through the active element of the measuring instrument thus making it possible to know the output at all times.

Fig. 4 shows a portable instrument which may be placed directly on or next to the subject or at the place where the rays are being used. The cell could be constructed substantially as described, and would be housed in a suitable case 15 with a meter 16 as shown. The meter may be calibrated in any desired units, but is preferably calibrated in Roentgens per second.

The voltage output from such a cell calibrated in Roentgens is dependent not only upon the character of material from which the cell is made but also the filters. The current is dependent upon the area exposed.

The voltage from single cells being relatively low, it is sometimes desirable to increase the same, particularly where the rays measured are relatively weak and/or where it is desirable to position the meter at a distance from the cell. For instance, the cell being in the treatment cone, the operator desires to know the output and is usually in a shielded compartment separate from the machine. In such a case a battery of cells connected in series may be substituted for the single cell. Fig. 3 shows diagrammatically a magnified section of such a battery comprising a plurality of superposed cells. The order of superposing the materials forming each cell and the battery is indicated. The two outside layers may comprise sheets of copper 32. A coating of copper (cuprous) oxide 33 is next to the copper in each instance. A thin conductive layer of silver 34 is deposited on top of the copper oxide and then a layer of fluorescent material 35 is disposed next to the conducting layer, being interposed between it and the succeeding layer of conducting material which is the conductor for the next cell. Each pair of cells is separated by a thin sheet of dielectric 36. One terminal is taken directly from the copper, as in the uppermost cell. The silver conductor is then connected to the copper of the next cell and the silver conductor of that cell connected to the copper of the succeeding cell. Each cell is thus connected to the succeeding cell in series until the last or lower cell is reached. In the bottom cell a lead is taken from the last layer of silver. The combined voltages are then conducted by conductors 20 to the meter 21.

The entire battery may be made thin, the entire thickness being determined by the amount of filtering desired in the treatment cone or by the response desired by the cell to different wave lengths. The manner of superposing the elements cuts down the fluorescent elements so that for four cells, only two such elements are needed, and the series arrangement increases the voltage according to the number of cells.

As best shown in Fig. 6, I also contemplate a device for certain measurement purposes which is particularly sensitive to back scattered radiations as well as direct radiation. In this instance the copper 32 has oxide coatings 33 on each side, and the conductor material 34 is superposed on the oxide. The top and bottom surfaces of the element may then each be coated with the fluorescent material 35. This cell then being placed in the path of the rays between the source and the object being treated is effective to measure both the direct and the back scattered rays both of which are combined in a single reading.

It is possible with these improved cells to insulate the same against ordinary light and still obtain effective action because the light furnishing element is in a sense self-contained within the cells. It may thus be seen that various arrangement and combinations may be made depending upon the particular conditions to be met.

In Fig. 5 there has been shown another method of arrangement. In this instance the battery comprises four cells, 21—a—b—c—d, each assuming substantially 90° of a complete circle and divided from each other by suitable dielectric 22. These cells are also connected in series, the final leads being taken off of the silver on one side of cell 21a, and the copper on the other side of cell 21d. The fluorescent element in this instance could be a complete disc encircling all the cells. This same arrangement can be varied by making the layers of each cell so that the copper is on one side of one cell and the corresponding side of the adjacent cell is the fluorescent material, in this case it would be necessary to have separate fluorescent elements on each side of the cell.

Still another arrangement of the cells contemplated is that of arranging the battery of relatively narrow cells so that the width of each cell represents the thickness of the battery, the edges of the cells being presented to the rays. Obviously the penetrating quality of the rays is sufficient to energize all of the cells.

It is possible to calibrate the output of the device in Roentgens per second so that the intensity of the rays from the machine under observation may be read directly and the output determined at any moment.

By positioning the meter so that the intensity of the rays passing through an object may be determined, the exact amount of exposure to accomplish a certain objective may be readily computed.

Many other uses for the device will also be apparent to those who are versed in the art.

Having thus described my invention, I am aware that numerous and extensive departures may be made therefrom but without departing from the scope of the invention.

I claim:

1. In a device for measuring the intensity of radiations from an X-ray tube, comprising a plurality of photovoltaic cells connected in series with each other, fluorescent members superposed on each of said cells, said cells being sensitive to fluorescence from said members, and said members adapted to fluoresce in the presence of X-rays, and an output meter connected to indicate the output of said cells.

2. In a device for measuring X-rays, an element adapted to be placed in the path of X-ray radiations and including a battery comprising a plurality of cells connected in series, each cell comprising a copper base, a photoresponsive layer such as copper oxide, a conducting layer on top of the photoresponsive layer, and a fluorescent layer adjacent the conductor, and an output meter for indicating the output of the battery.

3. In a device for indicating the intensity of X-ray radiation from an X-ray machine having a treatment cone, means sensitive to magnetic radiations for insertion in the treatment cone of said machine comprising a plurality of elements connected in series with each other, and a meter coupled to the output of said elements, each of said elements including a photo-electric cell, and a fluorescent material superposed over the face of each cell adapted for energization by said radiations.

JOHN A. VICTOREEN.